(12) United States Patent
Park et al.

(10) Patent No.: US 11,289,098 B2
(45) Date of Patent: Mar. 29, 2022

(54) METHOD AND APPARATUS WITH SPEAKER RECOGNITION REGISTRATION

(71) Applicant: SAMSUNG ELECTRONICS CO., LTD., Suwon-si (KR)

(72) Inventors: Sung-Un Park, Suwon-si (KR); Kyuhong Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 26 days.

(21) Appl. No.: 16/781,176

(22) Filed: Feb. 4, 2020

(65) Prior Publication Data
US 2020/0286489 A1    Sep. 10, 2020

(51) Int. Cl.
G10L 17/04 (2013.01)
G10L 13/00 (2006.01)
G10L 17/00 (2013.01)
G10L 17/02 (2013.01)
G10L 17/06 (2013.01)
G10L 17/18 (2013.01)
G10L 25/21 (2013.01)
G10L 25/84 (2013.01)

(52) U.S. Cl.
CPC .............. G10L 17/04 (2013.01); G10L 13/00 (2013.01); G10L 17/00 (2013.01); G10L 17/02 (2013.01); G10L 17/06 (2013.01); G10L 17/18 (2013.01); G10L 25/21 (2013.01); G10L 25/84 (2013.01)

(58) Field of Classification Search
CPC ....................................................... G10L 17/04
See application file for complete search history.

(56) References Cited

U.S. PATENT DOCUMENTS

| 6,253,179 | B1* | 6/2001 | Beigi | G10L 17/04 704/243 |
| 7,215,776 | B1* | 5/2007 | Short | H04L 9/001 380/263 |
| 9,230,550 | B2 | 1/2016 | Hosom et al. | |
| 9,601,107 | B2 | 3/2017 | Okamoto | |
| 10,448,151 | B1 | 10/2019 | McNair | |
| 2003/0009333 | A1* | 1/2003 | Sharma | G10L 15/04 704/246 |
| 2005/0143997 | A1* | 6/2005 | Huang | G10L 17/04 704/247 |
| 2011/0040561 | A1* | 2/2011 | Vair | G10L 17/04 704/240 |

(Continued)

FOREIGN PATENT DOCUMENTS

| JP | 4655184 B2 | 3/2011 |
| JP | 4714523 B2 | 6/2011 |

OTHER PUBLICATIONS

Extended European Search Report dated Oct. 21, 2020 in counterpart European Patent Application No. 20161160.5 (14 pages in English).

(Continued)

Primary Examiner — Douglas Godbold
(74) Attorney, Agent, or Firm — NSIP Law

(57) ABSTRACT

A method with registration includes: receiving a speech signal of a speaker; synthesizing the received speech signal and a noise signal to generate a synthesized signal; generating a feature vector based on the synthesized signal; and constructing a registration database (DB) corresponding to the speaker based on the generated feature vector.

44 Claims, 14 Drawing Sheets

(56) References Cited

U.S. PATENT DOCUMENTS

| | | | | |
|---|---|---|---|---|
| 2012/0303369 | A1* | 11/2012 | Brush | G10L 17/02 704/246 |
| 2013/0225128 | A1* | 8/2013 | Gomar | H04W 12/06 455/411 |
| 2014/0222428 | A1* | 8/2014 | Cumani | G10L 17/02 704/250 |
| 2014/0244257 | A1* | 8/2014 | Colibro | G10L 17/12 704/246 |
| 2016/0142579 | A1 | 5/2016 | Beckmann et al. | |
| 2016/0293167 | A1 | 10/2016 | Chen et al. | |
| 2017/0169828 | A1* | 6/2017 | Sachdev | G10L 25/51 |
| 2017/0294191 | A1* | 10/2017 | Shi | G10L 15/20 |
| 2018/0082692 | A1* | 3/2018 | Khoury | G10L 17/20 |
| 2018/0226079 | A1* | 8/2018 | Khoury | G06K 9/6267 |
| 2018/0254046 | A1* | 9/2018 | Khoury | G10L 17/02 |
| 2018/0293990 | A1 | 10/2018 | Li et al. | |
| 2018/0336911 | A1* | 11/2018 | Dahl | G10L 21/0232 |
| 2018/0342250 | A1* | 11/2018 | Cohen | G10L 17/00 |
| 2019/0013013 | A1* | 1/2019 | McLaren | G10L 15/10 |
| 2020/0043503 | A1* | 2/2020 | Vaquero Aviles-Casco | G10L 17/20 |
| 2020/0194006 | A1* | 6/2020 | Grancharov | G10L 17/04 |

OTHER PUBLICATIONS

Yuo, Kuo-Hwei et al., "Combination of Autocorrelation-Based Features and Projection Measure Technique for Speaker Identification." *IEEE Transactions on Speech and Audio Processing*, vol. 13, No. 4, 2005 (pp. 565-574).

Ming, Ji et al., "A Comparative Study of Methods for Handheld Speaker Verification in Realistic Noisy Conditions." 2006 *IEEE Odyssey—The Speaker and Language Recognition Workshop*, 2006 (pp. 1-8).

Li, Na et al., "DNN-Driven Mixture of PLDA for Robust Speaker Verification." *IEEE/ACM Transactions on Audio, Speech, and Language Processing*, vol. 25, No. 6, 2017 (pp. 1371-1383).

Partial European Search Report dated Jul. 1, 2020 for the corresponding European Patent Application No. 20161160.5 (13 pages in English).

* cited by examiner

FIG. 1
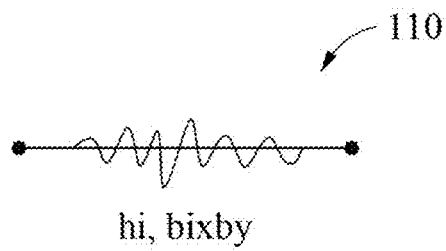
hi, bixby
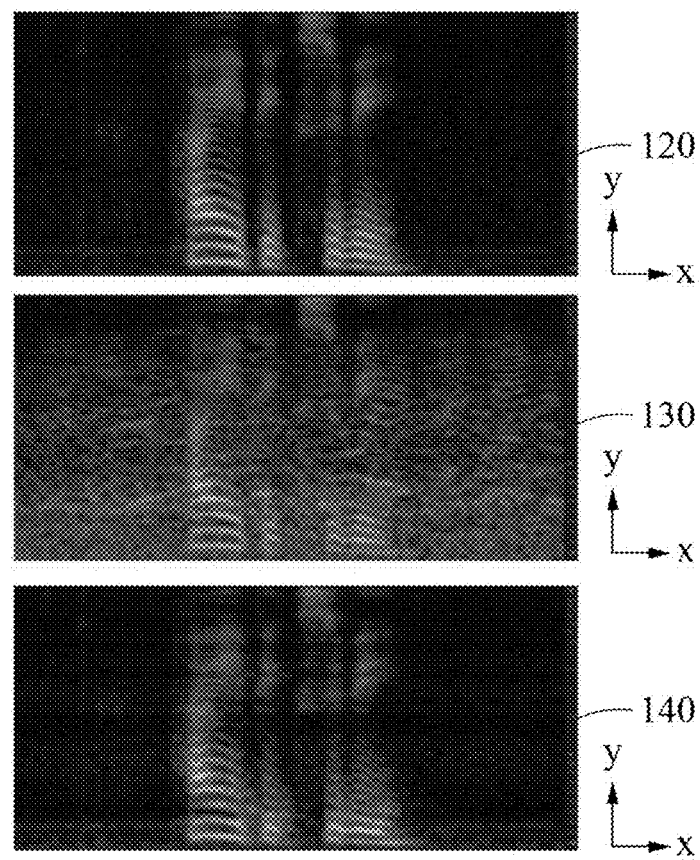

FIG. 14
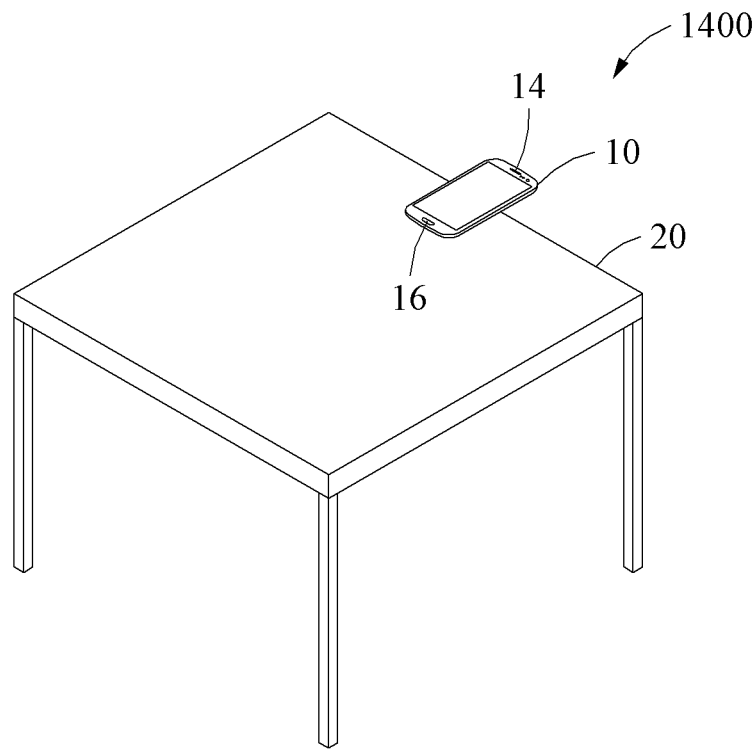
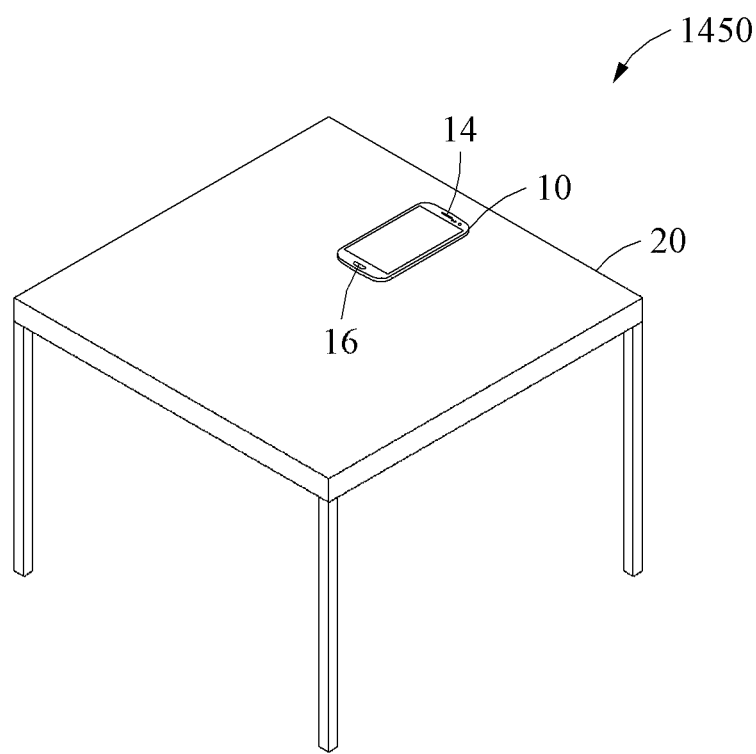

METHOD AND APPARATUS WITH SPEAKER RECOGNITION REGISTRATION

CROSS-REFERENCE TO RELATED APPLICATIONS

This application claims the benefit under 35 USC § 119(a) of Korean Patent Application No. 10-2019-0026714 filed on Mar. 8, 2019, and Korean Patent Application No. 10-2019-0051557 filed on May 2, 2019, in the Korean Intellectual Property Office, the entire disclosures of which are incorporated herein by reference for all purposes.

BACKGROUND

1. Field

The following description relates to a method and apparatus with speaker recognition.

2. Description of Related Art

Speaker recognition is used to verify or identify a speaker based on a voice or speech of the speaker, and may be applied to various situations and fields of application, for example, meetings, conferences, and identification in a dialog or conversation. A speaker recognition system may be applied to vehicles, buildings, and bank accounts for access control for the purpose of security.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method with registration includes: receiving a speech signal of a speaker; synthesizing the received speech signal and a noise signal to generate a synthesized signal; generating a feature vector based on the synthesized signal; and constructing a registration database (DB) corresponding to the speaker based on the generated feature vector.

The method may further include: generating a second feature vector based on the received speech signal, wherein the constructing of the registration DB includes constructing the registration DB based on either one or both of the feature vector and the second feature vector.

The constructing of the registration DB may include: clustering, into groups, a plurality of feature vectors including either one or both of the feature vector and the second feature vector; and extracting at least one representative feature vector corresponding to at least one of the groups.

The second feature vector may be based on the received speech signal without the synthesizing.

The generating of the feature vector may include: performing a domain transformation on the synthesized signal; and extracting the feature vector from a result of the domain transformation.

The synthesized signal may include time-domain sound information, and the result of the domain transformation may include frequency-domain image information. The generating of the feature vector may include extracting the feature vector from the frequency-domain image information using a convolutional neural network (CNN).

The synthesizing may include adding the noise signal to the received speech signal. The noise signal may include an additive noise signal.

The additive noise signal may be determined based on any one or any combination of any two or more of a type of noise, a timing of noise, and a signal-to-noise ratio (SNR) indicating an energy ratio of noise to the speech signal.

The synthesizing may include performing a convolution operation on the received speech signal and the noise signal. The noise signal may include a channel noise signal.

The channel noise signal may be determined based on at least one of a type of noise or an SNR indicating an energy ratio of noise to the speech signal.

The generating of the feature vector may include: segmenting the synthesized signal into sections; and extracting at least one sectional feature vector corresponding to at least one of the sections.

The method may further include: extracting a start point and an end point of sound information included in either one or both of the speech signal and the synthesized signal, wherein the start point and the end point are applied to either one or both of the synthesizing and the generating.

The receiving of the speech signal may include receiving speech signals of the speaker through channels. The synthesizing and the generating may be performed independently for each channel among the channels. The constructing of the registration DB may include constructing the registration DB based on feature vectors generated through the channels.

The method may further include: after receiving the speech signals, estimating noise based on a difference between the received speech signals; and subtracting the noise from each of the received speech signals.

The receiving of the speech signal may include receiving speech signals of the speaker through channels. The method may further include determining the speech signal for the synthesizing by preprocessing the received speech signals.

The determining of the speech signal may include selecting one speech signal from the received speech signals based on whether a recognition error due to a hardware specification is included in the received speech signals.

The determining of the speech signal may include selecting one speech signal from the received speech signals for each section among sections of the received speech signals based on whether a recognition error due to a hardware specification is included in each section of the received speech signals.

The method may further include recognizing the speaker by comparing an input speech signal to the generated feature vector.

In another general aspect, a non-transitory computer-readable storage medium stores instructions that, when executed by a processor, cause the processor to perform the method described above.

In another general aspect, a speaker recognition method includes: receiving a speech signal of a speaker; generating at least one input feature vector based on the received speech signal; comparing the at least one input feature vector to at least one registered feature vector of a registered user stored in a registration database (DB); and recognizing the speaker based on a result of the comparing, wherein the at least one registered feature vector is generated based on a synthesized signal of a speech signal for registering the registered user and a noise signal.

The registered user may include a plurality of registered users. The recognizing of the speaker may include identifying the speaker from among the plurality of registered users.

The generating of the at least one input feature vector may include: performing a domain transformation on the received speech signal; and extracting the input feature vector from a result of the domain transformation.

The performing of the domain transformation may include: performing a fast Fourier transform (FFT) on the received speech signal; and performing padding on a result of the FFT based on the result of the FFT.

The generating of the at least one input feature vector may include: performing a sliding window operation on the received speech signal such that a window size of the input feature vector is equal to a window size of the registered feature vector.

A number of the at least one input feature vector may be determined based on a security level or a response time that is required by an application.

The noise signal may include either one or both of an additive noise signal and a channel noise signal.

The receiving of the speech signal may include receiving speech signals of the speaker through channels. The generating and the comparing may be performed independently for each of the channels. The registered feature vector may include registered feature vectors generated through the channels.

The speaker recognition method may further include: after receiving the speech signals, estimating noise based on a difference between the received speech signals; and subtracting the noise from each of the received speech signals.

The receiving of the speech signal may include receiving speech signals of the speaker through channels. The speaker recognition method may further include: determining the speech signal for the synthesizing by preprocessing the received speech signals.

The determining of the speech signal may include selecting one speech signal from the received speech signals based on whether a recognition error due to a hardware specification is included in the received speech signals.

The determining of the speech signal may include selecting one speech signal from the received speech signals for each section among sections of the received speech signals based on whether a recognition error due to a hardware specification is included in each section of the received speech signals.

The method may further include generating the at least one registered feature vector based on the synthesized signal and storing the at least one registered feature vector in the registration DB, prior to the receiving of the speech signal.

In another general aspect, a non-transitory computer-readable storage medium stores instructions that, when executed by a processor, cause the processor to perform the speaker recognition method described above.

In another general aspect, an apparatus with registration includes: an acoustic sensor configured to receive a speech signal of a speaker; and a processor configured to synthesize the received speech signal and a noise signal to generate a synthesized signal, generate a feature vector based on the synthesized signal, and construct a registration database (DB) corresponding to the speaker based on the generated feature vector.

The processor may be further configured to generate a second feature vector based on the received speech signal, and construct the registration DB based on either one or both of the feature vector and the second feature vector.

The processor may be further configured to cluster, into groups, a plurality of feature vectors including either one or both of the feature vector and the second feature vector, and extract at least one representative feature vector corresponding to at least one of the groups.

The second feature vector may be based on the received speech signal without the synthesizing.

The processor may be further configured to perform a domain transformation on the synthesized signal, and extract the feature vector from a result of the domain transformation.

The processor is may be further configured to add the noise signal to the received speech signal. The noise signal may include an additive noise signal.

The processor may be further configured to perform a convolution operation on the received speech signal and the noise signal. The noise signal may include a channel noise signal.

The processor may be further configured to segment the synthesized signal into sections, and extract at least one sectional feature vector corresponding to at least one of the sections.

The processor may be further configured to recognize the speaker by comparing an input speech signal to the generated feature vector.

In another general aspect, an apparatus with speaker recognition includes: an acoustic sensor configured to receive a speech signal of a speaker; and a processor configured to generate at least one input feature vector based on the received speech signal, compare the at least one input feature vector to at least one registered feature vector of a registered user stored in a registration database (DB), and recognize the speaker based on a result of the comparing, wherein the at least one registered feature vector is generated based on a synthesized signal of a speech signal for registering the registered user and a noise signal.

The processor may be further configured to perform a domain transformation on the received speech signal, and extract the input feature vector from a result of the domain transformation.

The processor may be further configured to perform a sliding window operation on the received speech signal such that a window size of the input feature vector is equal to a window size of the registered feature vector.

The processor may be further configured to: perform a fast Fourier transform (FFT) on the received speech signal; and perform padding on a result of the FFT based on the result of the FFT.

The processor may be further configured to generate the at least one registered feature vector based on the synthesized signal and store the at least one registered feature vector in the registration DB, prior to the receiving of the speech signal.

Other features and aspects will be apparent from the following detailed description, the drawings, and the claims.

BRIEF DESCRIPTION OF THE DRAWINGS

FIG. 1 illustrates an example of a speaker recognition method.

FIG. 14 illustrates an example of a method robust against an utterance change by a location and a direction of a registration apparatus embodiment.

Figure 2:
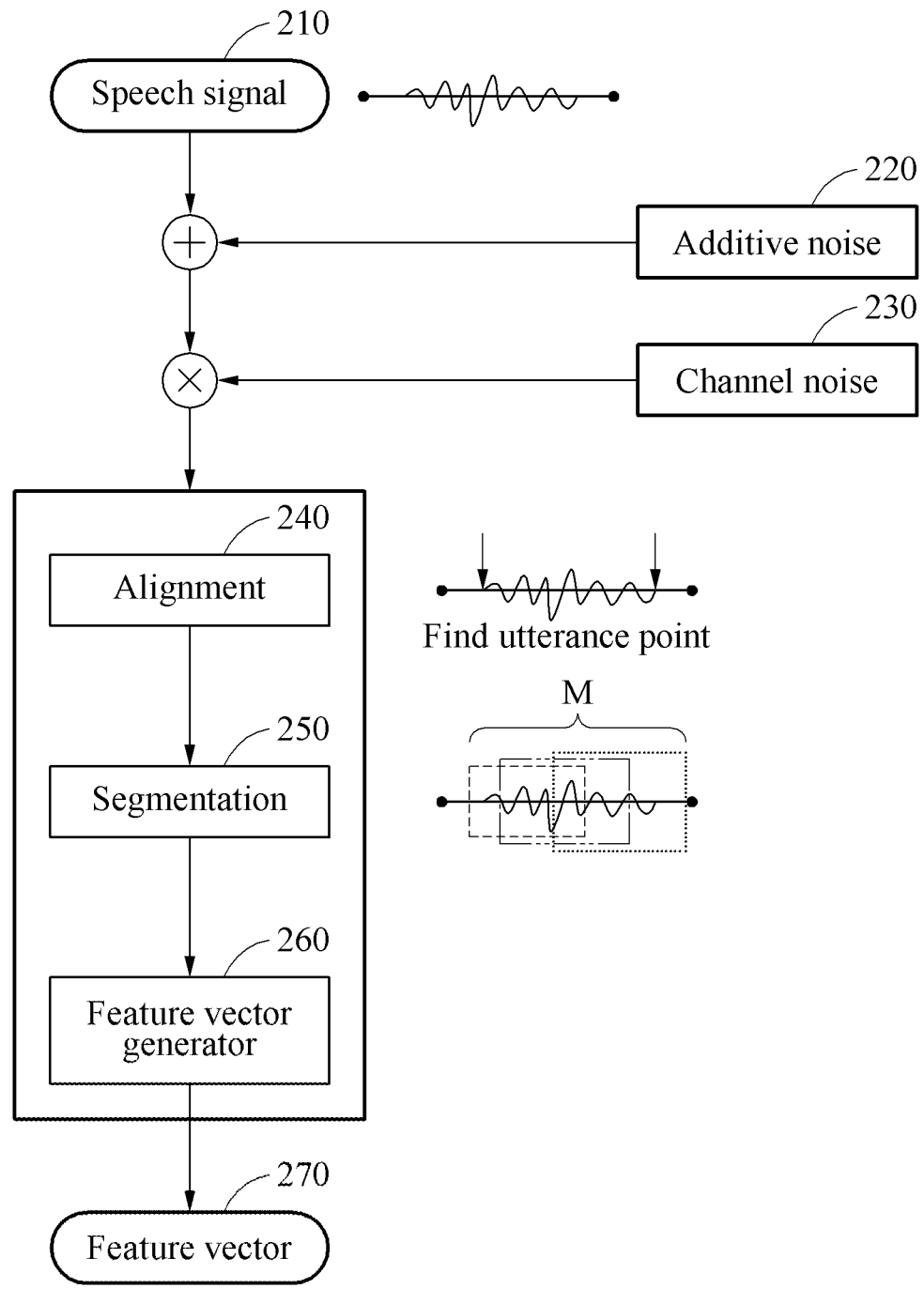
FIG. 2 illustrates an example of a registration system for speaker recognition.

Throughout the drawings and the detailed description, the same drawing reference numerals refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

A speaker recognition method and apparatus may be applied to vehicles, buildings, and bank accounts for access control for the purpose of security. According to the following description, a system and method to verify or authenticate a speaker from a voice of the speaker may be robust against noise, and may utilize limited voice information of a speaker.

FIG. 1 illustrates an example of a speaker recognition method. Referring to FIG. 1, a speaker recognition method includes a registration process and a test process. The speaker recognition method may be performed by a speaker recognition apparatus, which may be embodied by one or more hardware modules, or a combination of hardware modules and software modules.

To perform the speaker recognition method, in the registration process, the speaker recognition apparatus may generate a feature vector from an input voice or speech of a speaker and store the generated feature vector in a registration database (DB). In the test process, the speaker recognition apparatus may compare the feature vector generated from the input speech to a feature vector stored in the registration DB, and determine whether to recognize the speaker. Hereinafter, examples of performing the registration process and the test process by the same speaker recognition apparatus will be described for convenience of description. However, the examples may also be applied to examples of performing the registration process and the test process by different apparatuses.

Referring to FIG. 1, a speech signal 110 may be a speech signal of a speaker corresponding to a preset sentence which is a target for verification. For example, the speech signal 110 is a speech signal of a speaker corresponding to a sentence to be recognized, for example, "hi, bixby" as illustrated.

In the registration process, the speaker recognition apparatus receives the speech signal 110 corresponding to "hi, bixby," which is a speech uttered by the speaker, generates a feature vector, and stores the generated feature vector in a registration DB. In the test process, when the speech signal 110 corresponding to the speech "hi, bixby" is received, the speaker recognition apparatus generates a feature vector corresponding to the speech signal 110 and compares the generated feature vector to a feature vector stored in the registration DB, and determines whether to recognize the speaker.

The registration process may be performed in a quiet environment having relatively less noise, whereas the test process may be performed in an environment having relatively great noise. Thus, in the registration process, a feature vector may be generated based on a speech signal, for example, a speech signal 120, in an environment with less noise. However, in the test process, noise may be added to a speech signal of a speaker based on a surrounding environment and a feature vector may be generated based on a speech signal to which the noise is added, for example, a speech signal 130 and a speech signal 140. The noise may include additive noise, channel noise, or a combination thereof. The speech signal to which the noise is added may include, for example, the speech signal 130 to which the additive noise is added and the speech signal 140 to which the channel noise is added. In such an example, a mismatch between the feature vector generated in the registration process and the feature vector generated in the test process may occur, and thus a level of performance in recognition may be degraded. In addition, in a case in which the number of utterances of a speech signal of a speaker corresponding to a sentence to be recognized is relatively small in the registration process, an error in feature vector may readily occur, and thus the recognition may not be readily performed.

To help prevent such degradation of the performance that may occur due to a mismatch between an environment in which the registration process is performed (hereinafter, "registration environment") and an environment in which the test process is performed (hereinafter, "test environment"), a feature vector may be registered based on a synthesized signal obtained by synthesizing a speech signal of a speaker and a preset noise signal in the registration process. Thus, when performing verification in an actual environment which is different from the registration environment and is exposed to various types of noise, it is possible to improve a level of performance in the verification.

Speaker recognition may be classified into speaker verification and speaker identification. The speaker verification is to verify whether a speaker is a registered user or not, and the speaker identification is to identify a speaker from among registered users.

The speaker recognition may be implemented in various embodiments in a wide range of fields, for example, embodiments implementing management of individual electronic documents, and embodiments implementing banking and electronic commerce performed through example embodiment phones or Internet. For the speaker recognition, a method using a voice or speech is generally used because there is a low risk of theft or imitation, compared to a physical mechanism such as a card, a seal, a signature, and an identity (ID) card. In addition, speaker recognition using a voice or speech may be readily performed from a long distance through an acoustic sensor such as a microphone, which is relatively low-priced compared to other methods using other biometric means, such as a fingerprint and a retina, which require relatively high-priced devices or equipment.

Hereinafter, a registration method for speaker recognition, which is robust against noise, will be described with reference to FIGS. 2 through 7. A speaker verification method will be described with reference to FIGS. 8 and 9, and a speaker recognition method will be described with reference to FIG. 10. In addition, a registration apparatus with speaker recognition will be described with reference to FIG. 11.

FIG. 2 illustrates an example of a registration system for speaker recognition. Referring to FIG. 2, a registration apparatus for speaker recognition receives a speech signal 210 of a speaker. The registration apparatus described herein refers to an apparatus configured to construct a registration DB corresponding to a speaker for speaker recognition, and may be embodied by, for example, a hardware module or a module including both hardware and software (e.g., a processor configured to execute instructions). The registration apparatus may be provided or used in various computing devices and/or systems, for example, a smartphone, a tablet computer, a laptop computer, a desktop computer, a television (TV), a wearable device, a security system, a smart home system, and the like.

The speech signal 210 may be a signal that is not processed after being received through an acoustic sensor of the registration apparatus, or a signal from which a component corresponding to noise is removed after being received through the acoustic sensor. Even for the signal that is not processed, a registration process may be generally performed in a quiet environment having less noise, and thus the signal that is not processed may not be significantly different from the signal from which the noise is removed.

To help prevent a degradation of performance that may occur due to a mismatch between a registration environment and a test environment, the registration apparatus may synthesize the speech signal 210, and an additive noise signal 220, a channel noise signal 230, or a combination thereof as illustrated in FIG. 2. Additive noise may be generated from a source different from that of a speech signal, and may have no correlation with the speech signal. The additive noise may be added to a speech signal through addition. The additive noise may include, for example, a door closing sound, a horn sound, and ambient noise. In addition, channel noise may be a type of noise detected in a conversion or transformation process. The channel noise may include, for example, a room impulse response. However, the types of noise described in the foregoing description are provided merely as examples of the additive noise and the channel noise, and thus the additive noise and the channel noise may include other various types of noise. Hereinafter, a method of synthesizing the speech signal 210, and the additive noise signal 220 and the channel noise signal 230, respectively, will be described in greater detail with reference to FIGS. 4 and 5.

Referring again to FIG. 2, in an example, the registration apparatus aligns a speech signal in stage 240. By aligning the speech signal, the registration apparatus may determine a target section to be processed, and extract a start point and an end point of sound information included in the speech signal to improve efficiency in registration and recognition. For example, the registration apparatus may measure strength of the speech signal to extract the start point and the end point of the sound information included in the speech signal, and set a section between the extracted start point and the extracted end point to be the target section to be processed. In this example, the speech signal to be aligned may be a synthesized signal in which the additive noise signal 220, the channel noise signal 230, or a combination thereof is synthesized.

In another example, the registration apparatus may extract a start point and an end point of sound information by aligning first the speech signal 210, and then synthesize the speech signal 210, and the additive noise signal 220, the channel noise signal 230, or a combination thereof. Alternatively, the speech signal 210 may be aligned first in another device, for example, a digital signal processor, and then be input to the registration apparatus. Subsequently, the additive noise signal 220, the channel noise signal 230, or a combination thereof may be synthesized along with the speech signal 210.

In an example, the registration apparatus segments a synthesized signal of a speech signal and a noise signal into a plurality of sections in stage 250. Hereinafter, a method of segmenting a synthesized signal will be described in greater detail with reference to FIG. 6.

Referring to FIG. 2, a feature vector generator 260 of the registration apparatus generates a feature vector based on the synthesized signal of the speech signal and the noise signal. The feature vector generator 260 recognizes the synthesized signal and outputs the feature vector corresponding to the recognized synthesized signal. The feature vector may include information distinguishing each recognition element, for example, time-based frequency information having compressed components in the speech signal that are needed for recognition.

Thus, by generating and registering a feature vector based on a synthesized signal obtained by synthesizing a speech signal of a speaker and various types of noise in a registration process, it is possible to prevent a degradation of performance that may occur due to a mismatch between a registration environment and a test environment.

Figure 3:
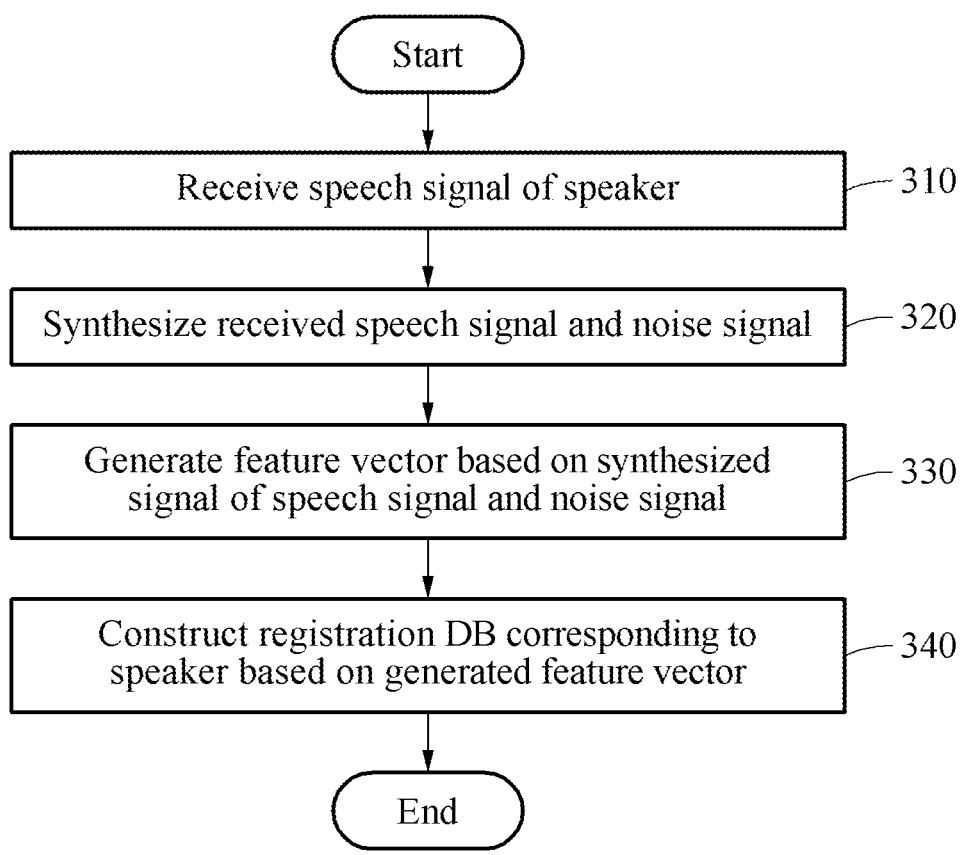
FIG. 3 illustrates a flowchart of an example of a registration method for speaker recognition.

FIG. 3 illustrates a flowchart of an example of a registration method for speaker recognition. Referring to FIG. 3, in operation 310, a registration apparatus for speaker recognition receives a speech signal of a speaker. The registration apparatus may receive a preset number of speech signals. For example, the registration apparatus repeatedly receives a speech signal of a speaker corresponding to a sentence to be recognized, for example, "hi, bixby," N times.

In operation 320, the registration apparatus synthesizes the received speech signal and a noise signal. The noise signal may be a signal preset to be similar to noise that may occur in a test process and include, for example, an additive noise signal, a channel noise signal, or a combination thereof.

In operation 330, the registration apparatus generates a feature vector based on a synthesized signal of the speech signal and the noise signal. Various methods may be performed to extract the feature vector from the synthesized signal. For example, the feature vector is generated by generating an image pattern from the synthesized signal through a fast Fourier transform (FFT), and inputting the generated image pattern to an artificial neural network that generates the feature vector. Such a feature vector generating method will be described in greater detail with reference to FIGS. 4 through 6. In addition, the registration apparatus generates a second feature vector based on the speech signal with which the noise signal is not synthesized.

In operation 340, the registration apparatus constructs a registration DB corresponding to the speaker based on the generated feature vector. The registration apparatus may construct the registration DB based on at least one of the generated feature vector and the second generated feature vector. The speaker recognition may be performed in the test process based on the registration DB constructed by operations 310 through 340.

Figure 4:
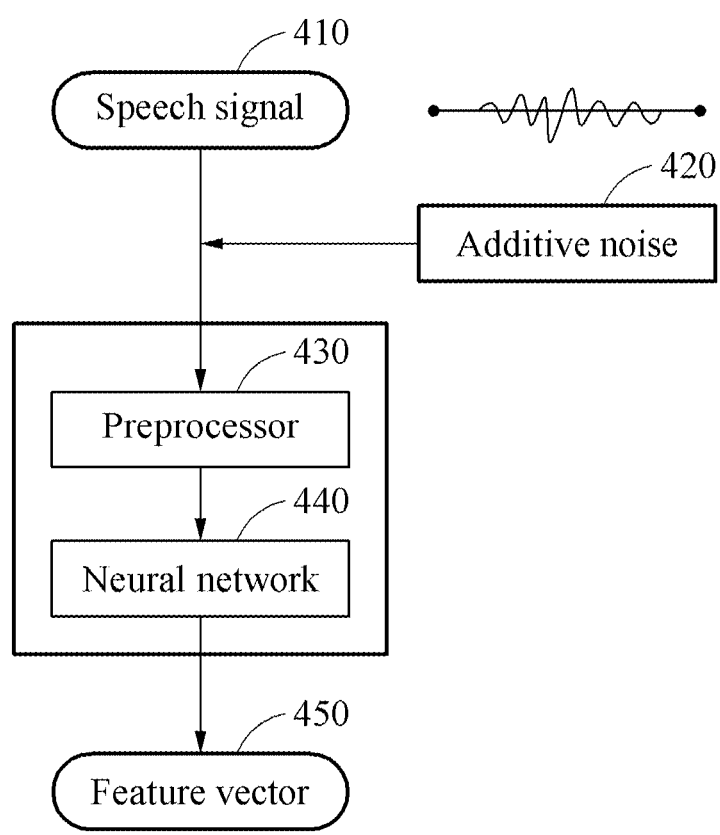
FIG. 4 illustrates an example of a method of generating a feature vector by synthesizing a speech signal and additive noise.

FIG. 4 illustrates an example of a method of generating a feature vector by synthesizing a speech signal and additive noise. Referring to FIG. 4, a registration apparatus receives a speech signal 410. The descriptions provided above with reference to FIGS. 1 through 3 are applicable to the method of FIG. 4, and thus a more detailed and repeated description will be omitted here.

Additive noise may occur from another source different from a source where the speech signal 410 occurs, and thus there is no correlation between the additive noise and the speech signal 410. In an example, a synthesized signal is generated by adding an additive noise signal 420 to the speech signal 410. In this example, when the speech signal 410 is a plurality of speech signals, the additive noise signal 420 is added to each of the speech signals, and thus a plurality of synthesized signals is generated.

The additive noise signal 420 may be determined in various ways. For example, the additive noise signal 420 is determined based on at least one of a type of noise, a timing of noise, or an energy ratio of noise to a speech signal (i.e., signal-to-noise ratio [SNR]). For another example, the additive noise signal 420 is determined based on a repetition and/or a combination of noise signals determined based on a type of noise, a timing of noise, and an SNR.

The type of noise refers to a type of source of noise including, for example, a babbling sound occurring nearby, a door closing sound, and a horn sound. The type of noise may differ from one noise to another noise based on a length of noise, even though the noises are generated from a same source. The timing of noise refers to a start point and/or an end point at which noise is synthesized with a speech signal. The SNR refers to a relative volume difference between a speech signal and noise.

As illustrated, the registration apparatus generates a feature vector 450 by inputting, to a feature vector generator, the synthesized signal of the speech signal 410 and the additive noise signal 420. The feature vector generator transforms a domain of the synthesized signal, and extracts the feature vector 450 from a result of the transforming. The synthesized signal is generated by adding the additive noise signal 420 to the speech signal 410, and thus may include time-domain sound information. The feature vector generator transforms a time-domain synthesized signal into a form of a frequency domain including image information, and generates the feature vector 450 based on the transformation.

In an example, the feature vector generator includes a preprocessor 430 and a neural network 440. The preprocessor 430 transforms the time-domain synthesized signal into the form of a frequency domain including the image information. For example, the preprocessor 430 transforms a domain of the synthesized signal into a frequency domain using an FFT to obtain spectral size information, and extracts the image information in a form of frequency domain as illustrated in FIG. 1, for example, by the representations of signals 120, 130, and 140. In the representations of signals 120, 130, and 140 in FIG. 1, an x axis indicates a time domain and a y axis indicates a frequency domain, and a level of brightness may be proportional to a spectral size.

The feature vector 450 is extracted by inputting, to the neural network 440, a result of the domain transformation including the image information. The neural network 440 may be embodied in various architectures and include, for example, a convolutional neural network (CNN) model. The CNN model includes one or more convolution layers, one or more pooling layers, and one or more fully connected layers, and may generate a feature vector from image information to be input thereto through an operation performed by each of the layers. The image information may indicate a pixel value of pixels included in an image, for example, a brightness value.

Although a CNN model is described above, the neural network 440 may include other types of models, including, a recurrent neural network (RNN) model, a deep belief network model, a fully connected network model, a bi-directional neural network model, a restricted Boltzmann machine model, or may include different or overlapping neural network portions respectively with full, convolutional, recurrent, and/or bi-directional connections.

The preprocessor 430 and the neural network 440 are provided as an example, and the feature vector generator may be based on other models configured to generate a feature vector in addition to the foregoing architecture of the preprocessor 430 and the neural network 440. For example, the feature vector generator may also be based on a linear predictive coding (LPC) method modeled by a human vocal tract, a filter bank method (e.g., Mel-scaled frequency cepstral coefficient [MFCC]) modeled by a human auditory organ, or a combination thereof (e.g., method of transforming a speech signal based on an MFCC and inputting a result of the transforming to a neural network).

Figure 5:
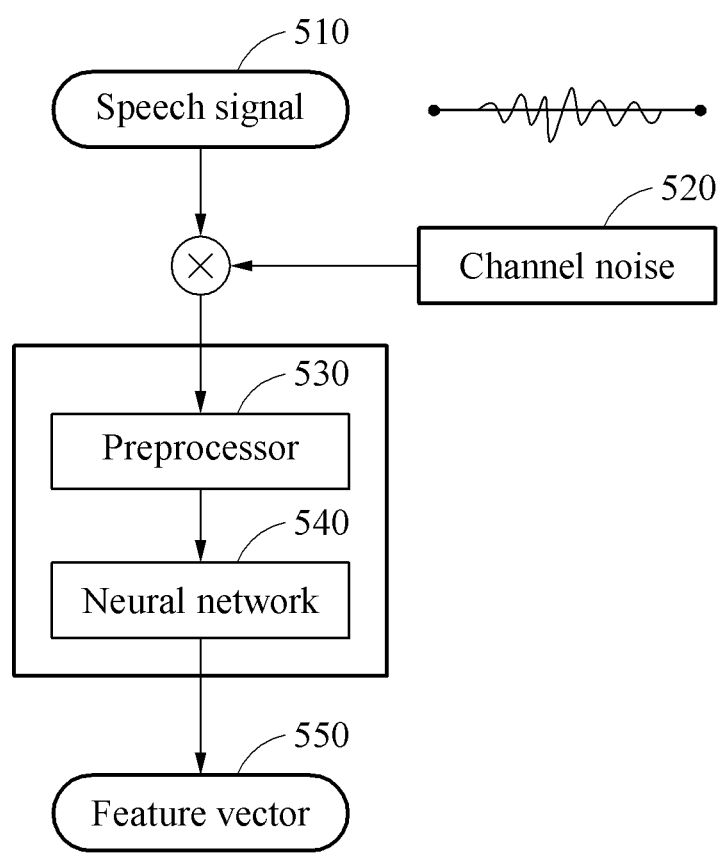
FIG. 5 illustrates an example of a method of generating a feature vector by synthesizing a speech signal and channel noise.

FIG. 5 illustrates an example of a method of generating a feature vector by synthesizing a speech signal and channel noise. Referring to FIG. 5, channel noise may be noise generated based on an intrinsic characteristic of a location at which a speech signal 510 is input, dissimilar to additive noise generated from a source different from that of the speech signal 510. A registration apparatus generates a synthesized signal by performing a convolution operation on the speech signal 510 and a channel noise signal 520.

The channel noise signal 520 may be determined based on at least one of a type of noise or an SNR. For example, the channel noise signal 520 may be determined by a repetition and/or combination of noise signals determined based on a type of noise and an SNR.

The type of noise may differ based on a type of location from which reverberation is generated, for example, a large room, a small room, and a concert hall. In addition, the type of noise may differ based on a characteristic of a microphone. The SNR refers to a relative volume difference between a speech signal and a noise signal. The description provided above regarding the feature vector generator with respect to FIG. 4 is also applicable hereto, and thus a more detailed and repeated description will be omitted here.

Figure 6:
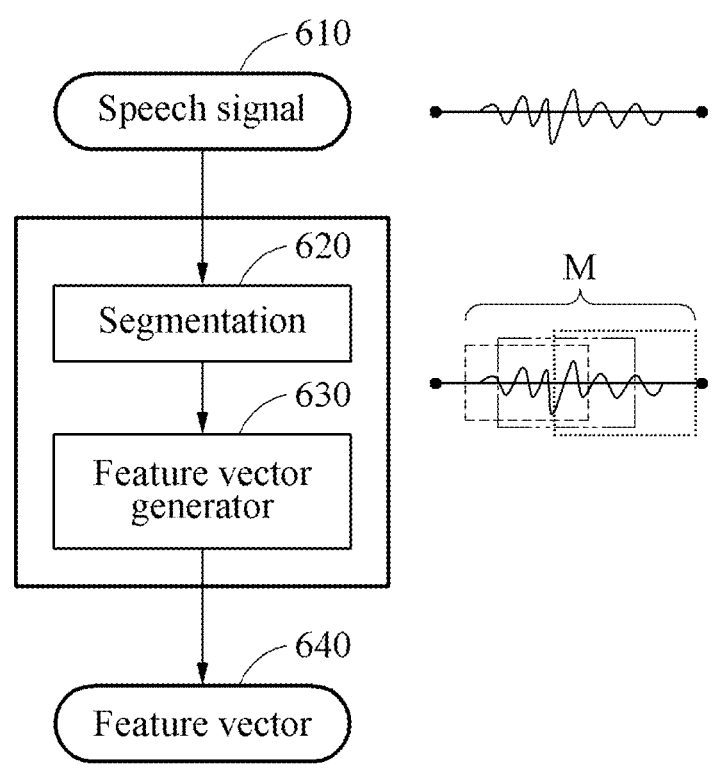
FIG. 6 illustrates an example of a method of generating a feature vector through segmentation.

FIG. 6 illustrates an example of a method of generating a feature vector through segmentation. Referring to FIG. 6, a registration apparatus receives a speech signal 610.

When a speech signal of a speaker corresponding to a sentence to be recognized is uttered by a relatively small number of times in a registration process, performance of a recognizer configured to recognize a start point of the utterance may become more sensitive, and thus an error in representative feature vector may easily occur and recognition may not be readily performed. In addition, when a method using only a section of the speech signal 610, for example, a center crop method of selecting a central section of a speech signal, is used to generate a feature vector, a bias may increase in selecting an utterance point.

In an example, the registration apparatus segments the speech signal 610 into a plurality of sections in stage 620 to register and use a limited utterance in various ways. The segmentation in stage 620 may be performed in time series, and window sizes of the sections may be the same. In addition, there may be an overlapping portion between neighboring sections among the sections.

A feature vector generator 630 generates a feature vector 640 based on the sections. The feature vector generator 630 extracts at least one sectional feature vector corresponding to at least one of the sections. Here, a sectional feature vector refers to a feature vector generated based on a section segmented through the segmentation in stage 620. For example, when the registration apparatus segments one speech signal into M sections in stage 620, M sectional feature vectors are generated. For another example, when the registration apparatus receives N speech signals 610 and segments each of the received N speech signals 610 into M sections in stage 620, N×M sectional feature vectors are generated.

A method of generating a feature vector is described above with reference to FIGS. 4 through 6. The method may include an example method of generating a feature vector by synthesizing a speech signal and additive noise as described with reference to FIG. 4, an example method of generating a feature vector by synthesizing a speech signal and channel noise as described with reference to FIG. 5, an example method of generating a feature vector through segmentation as described with reference to FIG. 6, and other various methods by combining the example methods described in the foregoing.

For example, the registration apparatus synthesizes N speech signals and P additive noise signals and performs segmentation to have M sections, thereby generating N×P×M feature vectors. For another example, the registration apparatus synthesizes N speech signals, and P1 additive noise signals and P2 channel noise signals, and performs segmentation to have M sections, thereby generating N×P1×P2×M feature vectors.

The registration apparatus may store generated feature vectors in a registration DB to construct the registration DB corresponding to a speaker to be recognized in speaker recognition. In a test process, the speaker recognition may be performed based on the constructed registration DB.

Figure 7:
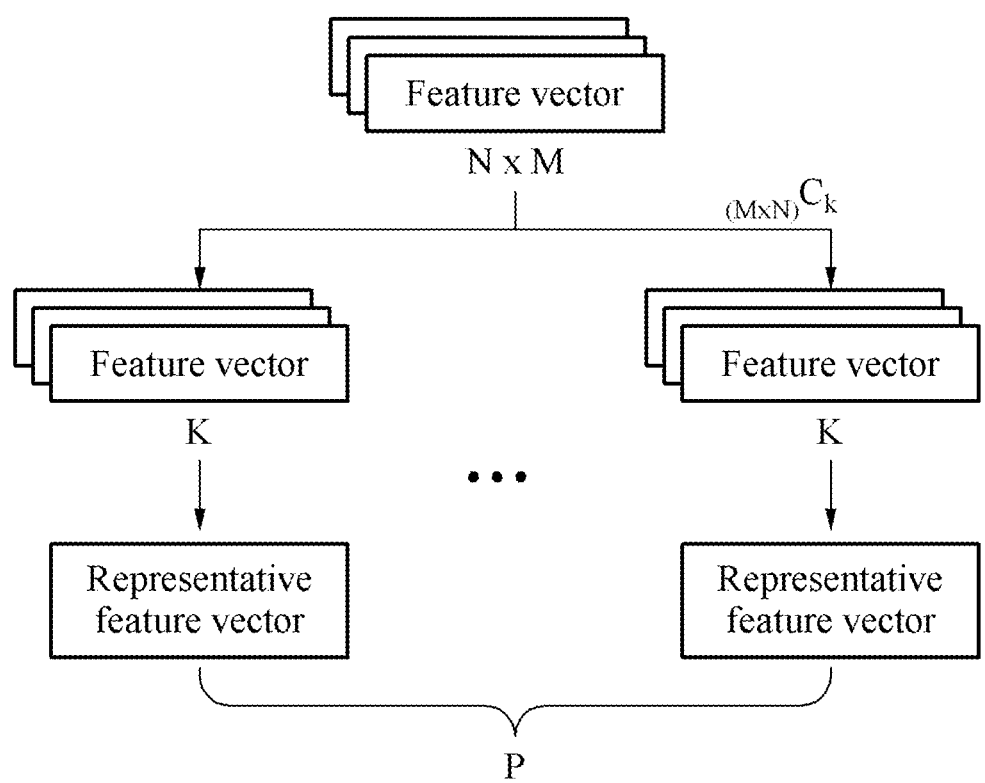
FIG. 7 illustrates an example of a method of constructing a registration database (DB).

FIG. 7 illustrates an example of a method of constructing a registration DB. Referring to FIG. 7, a registration apparatus constructs a registration DB based on a feature vector.

Although the registration apparatus constructs the registration DB by storing all generated feature vectors therein, the construction may be greatly affected by an outlier and performance in processing data may be degraded because comparisons need to be performed on each of all the feature vectors in a test process.

In an example, the registration apparatus clusters a plurality of feature vectors into a plurality of groups, extracts at least one representative feature vector corresponding to at least one of the groups, and registers the extracted representative feature vector to construct the registration DB.

The registration apparatus clusters the feature vectors into the groups based on a type of noise and a segmented section. Alternatively, the registration apparatus clusters the feature vectors into the groups based on a similarity of each of the feature vectors. For example, the registration apparatus clusters the feature vectors based on a K-means algorithm. The K-means algorithm refers to an algorithm for grouping given data into k clusters, which may operate to minimize a variance in distance differences between the clusters. However, the clustering is not limited to the foregoing example method, and various methods may be used for the clustering according to a design.

The registration apparatus extracts the at least one representative feature vector corresponding to the at least one of the groups obtained by the clustering. Here, a representative feature vector may be a representative value of feature vectors included in each of the groups. For example, the representative vector is selected from the feature vectors included in each of the groups, or determined through a statistical operation on the feature vectors included in each of the groups. The representative feature vector may be a mean value of the feature values included in each of the groups, or a center value or centroid of the feature vectors. Using the representative feature vector, an influence of an outlier may be reduced, and it is thus possible to extract a robust feature value. For example, the registration apparatus clusters N×M feature vectors into groups each of which includes K feature vectors and extracts, as a representative value, a mean value for each of the groups, and thus extracts a total of P representative feature vectors. However, the extracting of a representative feature vector using a representative value is not limited to the foregoing example method. The number of feature vectors included in each group may differ from group to group, and various methods may be used to extract a representative feature vector according to a design.

Figure 8:
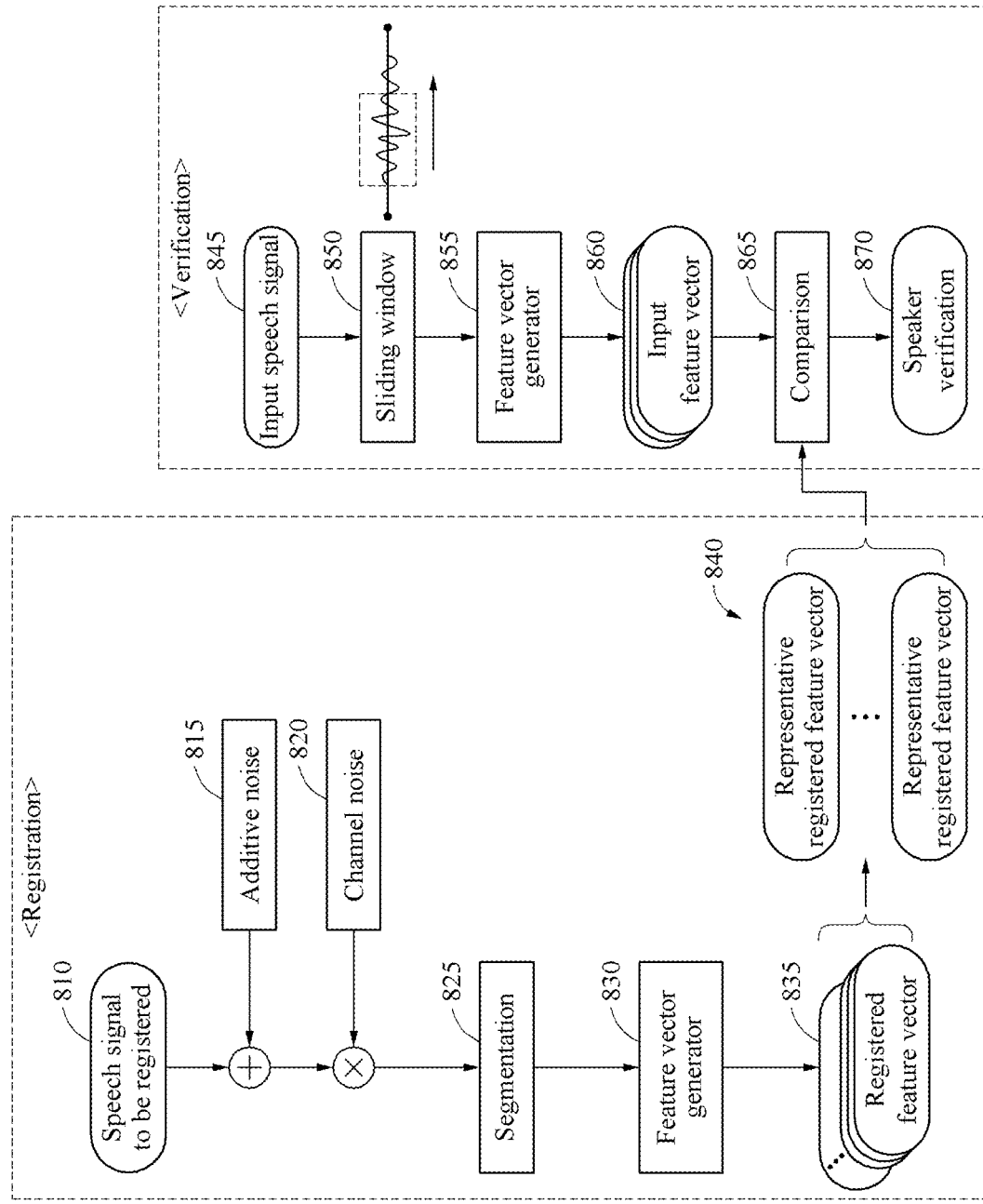
FIG. 8 illustrates an example of a speaker verification method.

FIG. 8 illustrates an example of a speaker verification method. Hereinafter, a speech signal 810 to be registered, a registered feature vector 835, and a representative registered feature vector 840 are used to explain a registration process, and indicate the same meanings of a speech signal, a feature vector, and a representative feature vector, respectively, previously described. Thus, the descriptions of the speech signal 810 to be registered, the registered feature vector 835, and the representative registered feature vector 840 are substantially the same as the descriptions of the speech signal, the feature vector, and the representative feature vector, and thus the descriptions provided above with reference to FIGS. 2 through 7 may also be applicable to the registration process to be described hereinafter with reference to FIG. 8.

In the registration process, a registration apparatus receives the speech signal 810 of a speaker, and synthesizes the speech signal 810 and additive noise 815 or channel noise 820. After performing segmentation in stage 825 on the synthesized signal obtained through the synthesizing, the registration apparatus generates the registered feature vector 835 by inputting a result of the segmentation to a feature vector generator 830, and extracts the representative registered feature vector 840 to construct a registration DB. To store all the registered feature vector 835 in the registration DB, the extracting of the representative registered feature vector 840 may be omitted.

A recognition apparatus embodiment receives an input speech signal 845 of a speaker. The input speech signal 845 may indicate a speech signal obtained from an utterance of the speaker for verification in a test process. The test process may be performed in an environment with a great amount of noise, and thus the input speech signal 845 may naturally include noise.

The recognition apparatus may be an apparatus configured to generate a feature vector from an input speech of a speaker and compare the generated feature vector to a feature vector stored in a registration DB, and determine whether to recognize the speaker (including verification). The recognition apparatus may be implemented by, for example, a a hardware module or a combination of a hardware module and a software module. The recognition apparatus may be provided as, or in, various computing devices and/or systems, for example, a smartphone, a tablet computer, a laptop computer, a desktop computer, a TV, a wearable device, a security system, a smart home system, and the like.

In an example, the recognition apparatus may include the registration apparatus. Herein, the recognition apparatus configured to perform the test process may also be referred to as a recognition apparatus without registration operations or merely relying on pre-registered information, and the recognition apparatus including the registration apparatus may also be referred to as a recognition apparatus, which may generate and thereafter rely on such registered information. Merely for convenience of explanation, a recognition apparatus and a registration apparatus may be separately described herein to distinguish functions of the recognition and functions of the registration. Thus, when implementing an actual product, all the functions may be configured to be processed in a single device, for example, the broadly defined recognition apparatus. For example, an acoustic sensor of the registration apparatus configured to receive the speech signal 810 may be the acoustic sensor of the recognition apparatus configured to receive the input speech signal 845. In addition, the feature vector generator 830 of the registration apparatus and a feature vector generator 855 of the recognition apparatus may be the same feature vector generator. Hereinafter, the recognition apparatus may indicate reference to the recognition apparatus, e.g., including or excluding the registration operations, for convenience of description. Likewise, while discussions of the registration apparatuses and methods may describe the registration operations, the referenced registration apparatuses and methods should be understood to also be inclusive of the recognition apparatus components and operations, i.e., a reference to a registration apparatus or method is not limited to only such registration components or operations.

The recognition apparatus segments and extracts the speech signal 845 of the speaker to be recognized such that a window size of an input feature vector is equal to a window size of a registered feature vector. For example, the recognition apparatus performs center cropping on the speech signal 845 of the speaker, or performs a sliding window operation on the speech signal 845 in stage 850. This is because comparing vectors may be enabled when a window size of an input feature vector and a window size of a registered feature vector are the same. Although the sliding window operation will be mainly described hereinafter for convenience of description, various methods may also be applied to segment and extract the speech signal 845.

The recognition apparatus inputs, to the feature vector generator 855, a result obtained by performing the sliding window operation in stage 850 to generate an input feature vector 860. As described above, the feature vector generator 855 may generate the input feature vector 860 using a neural network which is the same as a neural network for the feature vector generator 830.

In stage 865, the recognition apparatus compares at least one input feature vector 860 to at least one registered feature vector 835 or representative registered feature vector 840 of a registered user stored in the registration DB constructed in the registration process. The registered user described herein may be a speaker corresponding to a registered feature vector or a representative registered feature vector that is stored in the registration DB.

The recognition apparatus verifies the speaker in stage 870 based on a result of the comparing obtained in stage 865. In stage 870, the recognition apparatus verifies the speaker based on a similarity score between the input feature vector 860 and the registered feature vector 835, or the representative registered feature vector 840. For example, when a representative value of similarity scores is greater than or equal to a preset threshold value, the recognition apparatus determines the verifying of the speaker performed in stage 870 to be successful, or determines that the speaker is successfully verified. Alternatively, only when the number of registered feature vectors 835 or representative registered feature vectors 840 having respective similarity scores with the input feature vector 860 being greater than or equal to the threshold value is greater than or equal to a preset number, the recognition apparatus may determine the verifying of the speaker performed in stage 870 to be successful. However, conditions for the speaker verification in stage 870 are not limited to the conditions in the foregoing description, and thus various conditions may be applied to the speaker verification in stage 870.

A similarity score may be determined to be in a form of a matching score or a distance score, for example. The matching score may refer to a degree of similarity between the input feature vector 860 and the registered feature vector 835 or the representative registered feature vector 840, or a score indicating a similarity between the feature vectors. A low matching score may indicate a low similarity between the feature vectors, or that the feature vectors are less similar to each other. A high matching score may indicate a high similarity between the feature vectors, or that the feature vectors are highly similar to each other. The distance score may refer to a score indicating a feature distance, for example, a Euclidean distance, between the input feature vector 860 and the registered feature vector 835 or the representative registered feature vector 840. A low distance score may indicate that a feature distance between the feature vectors in a feature vector space is short, and a high distance score may indicate that the feature distance is long.

Figure 9:
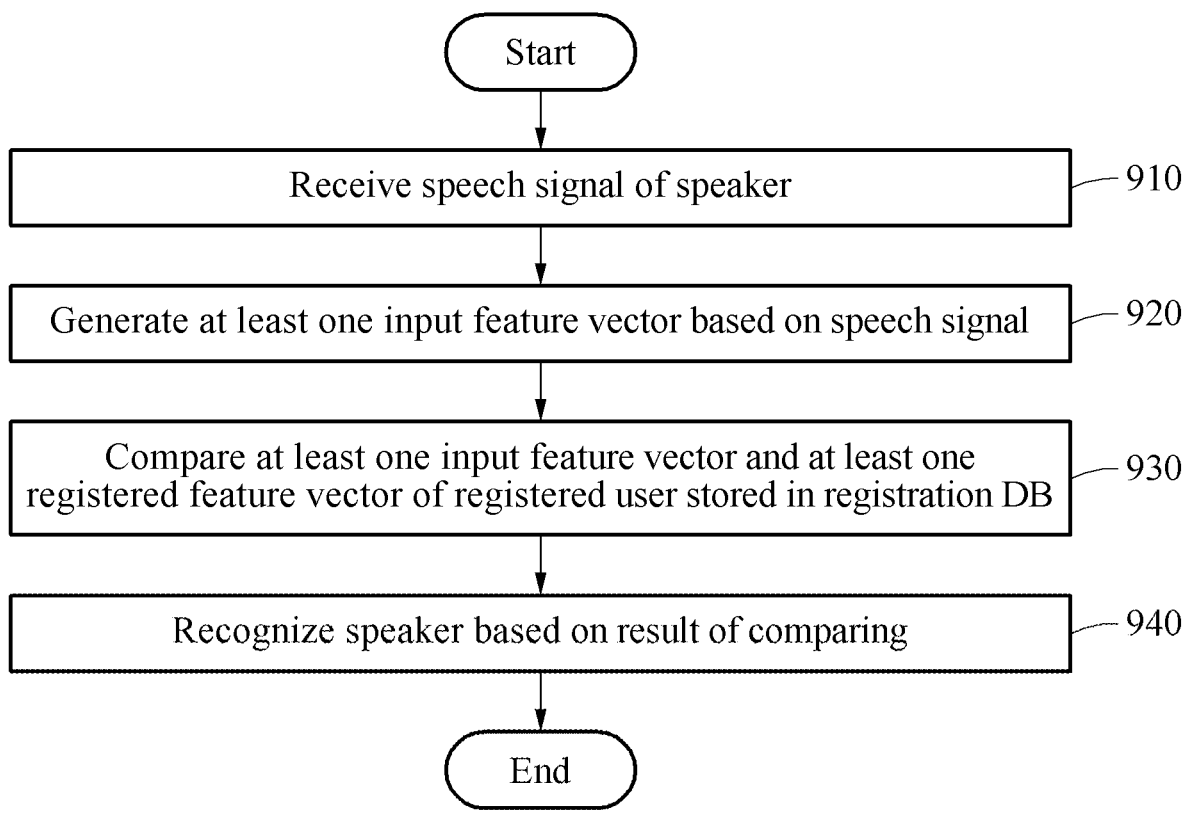
FIG. 9 illustrates a flowchart of an example of a speaker recognition method.

FIG. 9 illustrates a flowchart of an example of a speaker recognition method. Referring to FIG. 9, in operation 910, a recognition apparatus receives a speech signal of a speaker.

In operation 920, the recognition apparatus generates at least one input feature vector based on the received speech signal. Here, the number of input feature vectors may be determined based on a security level and a response time which are required by an application. The speaker recognition method described herein may be applied to perform a payment application, and unlock a smartphone, for example. When the speaker recognition method is applied to unlock a smartphone, user convenience may be more significantly considered compared to when the speaker recognition method is used for the payment application, and thus a smaller number of input feature vectors may be sufficient compared to when the speaker recognition method is used for the payment application.

The recognition apparatus performs a domain transformation on the speech signal of the speaker, and extracts an input feature vector from a result of the domain transformation. For example, the recognition apparatus performs an FFT on the speech signal of the speaker, and performs padding on a result of the FFT based on the result of the FFT.

The result obtained by performing the FFT may not include data in a section thereof. In such a case, data may be padded or filled through the padding. Where there is no data in a section as a result of the FFT, the padding may be performed based on data in a neighboring section adjacent to the section without the data. This is because a speech signal is a continuous signal, and a data value does not change rapidly during a sufficiently short period of time. For example, when the section in which the data is lost includes a plurality of unit sections, data in a first unit loss section may be determined to be a value same as that of data in a neighboring unit section immediately adjacent to the first unit loss section and not having data lost, and data in a second unit loss section may be determined to be a value same as that of data in a neighboring unit section immediately adjacent to the padded data and not having data lost.

In operation 930, the recognition apparatus compares the at least one input feature vector to at least one registered feature vector of a registered user stored in a registration DB. In operation 940, the recognition apparatus recognizes the speaker based on a result of the comparing. Here, the speaker recognition may include speaker verification and speaker identification. The speaker verification is to verify whether a speaker currently speaking is a registered user or not, and the speaker identification is to identify a speaker from among various registered speakers. Hereinafter, a method of the speaker identification will be described with reference to FIG. 10.

Figure 10:
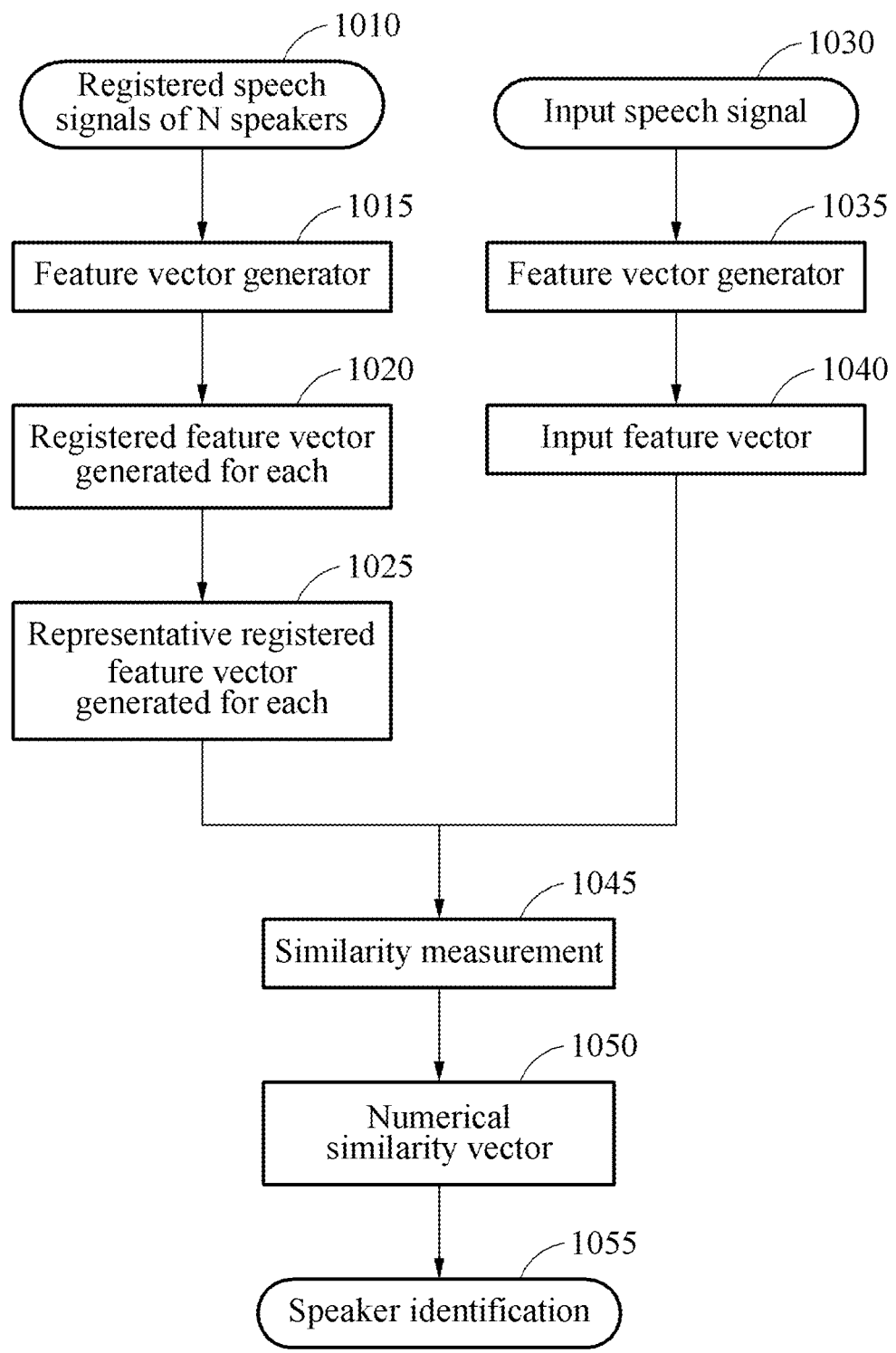
FIG. 10 illustrates an example of a speaker identification method.

FIG. 10 illustrates an example of a speaker identification method. Referring to FIG. 10, a speaker identification method may be used to identify a speaker who is currently speaking from among various registered users. The speaker identification method may be performed by performing speaker verification several times, because a plurality of registered users may be present.

As a non-limiting example, a registration process in the speaker identification method may be performed in a same way as a registration process in the speaker verification method described above with reference to FIG. 8. However, the speaker verification method may generate a feature vector for one speaker, and, as shown in FIG. 10, the speaker identification method may generate a feature vector for each of a plurality of speakers. For example, the speaker identification method may generate and register a feature vector 1020 for registered speech signals 1010 of N speakers using a feature vector generator 1015, and construct a registration DB for the N speakers.

A test process in the speaker identification method may be performed in a same way as a test process in the speaker verification method described above with reference to FIG. 8. For example, the test process may generate an input feature vector 1040 for an input speech signal 1030 using a feature vector generator 1035. For example, a similarity between the input feature vector 1040, and the registered feature vector 1020 generated for each individual speaker or a representative registered feature vector 1025 generated for each individual speaker, is measured in stage 1045 to determine a numerical similarity vector 1050. The numerical similarity vector 1050 may be an example of a similarity score. In stage 1055, the speaker identification method may identify, as a speaker, a registered user corresponding to a registered feature vector 1020 or a representative registered feature vector 1020 which has a greatest magnitude of the numerical similarity vector 1050 with respect to the input feature vector 1040. However, in such a case, a magnitude of a numerical similarity vector may need to be greater than or equal to a threshold value. In a case in which magnitudes of all numerical similarity vectors are less than the threshold value, the speaker identification method may output that the speaker does not correspond to a registered user. Alternatively, in stage 1055, the speaker identification method may identify, as the speaker, a registered user having a greatest number of registered feature vectors 1020 or representative registered feature vectors 1025 which have magnitudes of the numerical similarity vector 1050 greater than or equal to the threshold value. Alternatively, in stage 1055, the speaker identification method may identify, as the speaker, a registered user having a greatest representative value of the registered feature vector 1020 or the representative registered feature vector 1025 of which a magnitude of the numerical similarity vector 1050 is greater than or equal to the threshold value. However, a condition for identifying the speaker in stage 1055 is not limited to the foregoing examples, and thus various conditions may be applied to identify the speaker in stage 1055.

Figure 11:
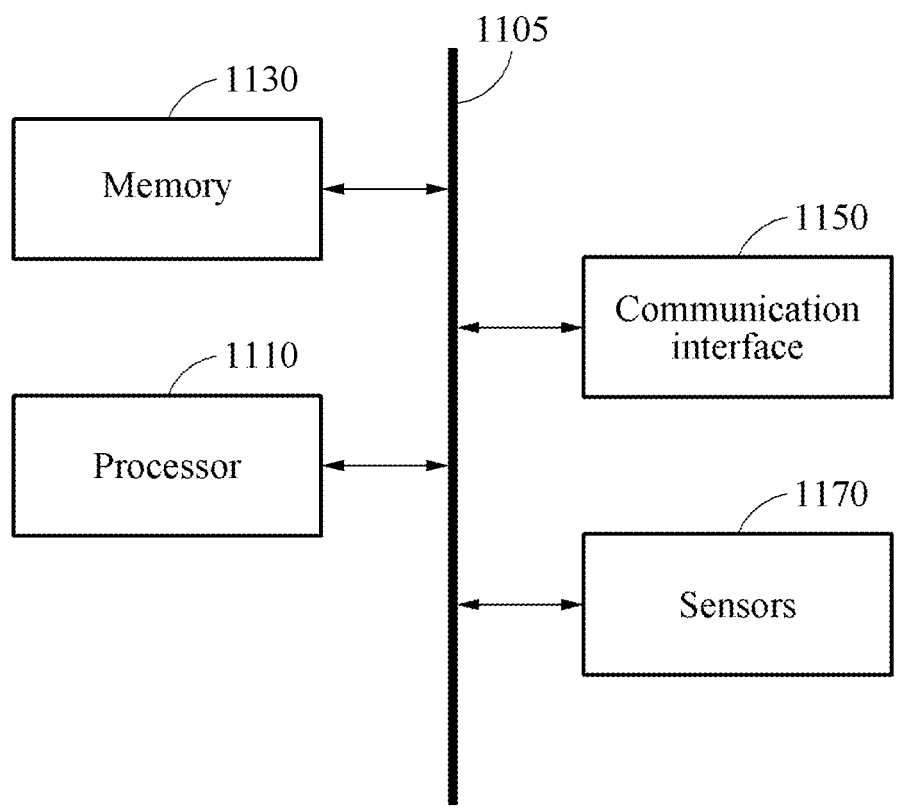
FIG. 11 illustrates an example of a registration apparatus for speaker recognition.

FIG. 11 illustrates an example of a registration apparatus 1100 for speaker recognition. Referring to FIG. 11, the registration apparatus 1100 includes a processor 1110. The registration apparatus 1100 further includes a memory 1130, a communication interface 1150, and sensors 1170. The processor 1110, the memory 1130, the communication interface 1150, and the sensors 1170 may communicate with one another through a communication bus 1105.

The processor 1110 synthesizes a speech signal and a noise signal, generates a feature vector based on a synthesized signal obtained by synthesizing the speech signal and the noise signal, and constructs a registration DB corresponding to a speaker based on the generated feature vector.

The memory 1130 includes the registration DB including feature vectors. The memory 1130 may be a volatile or nonvolatile memory.

The sensors 1170 include, for example, an acoustic sensor configured to receive the speech signal of the speaker. The sensors 1170 may collect various sets of sound information.

According to an example, the processor 1110 may generate a second feature vector based on the speech signal (e.g., with which the noise signal is not synthesized), and construct the registration DB based on at least one of the feature vector or the second feature vector. The processor 1110 performs a domain transformation on the synthesized signal, and extracts the feature vector from a result of the domain transformation. The processor 1110 adds an additive noise signal to the speech signal. The processor 1110 performs a convolution operation on the speech signal and a channel noise signal. The processor 1110 segments the synthesized signal into a plurality of sections, and extracts at least one sectional feature vector corresponding to at least one of the sections. The processor 1110 clusters a plurality of feature vectors including at least one of the feature vector and the second feature vector into a plurality of groups, and extracts at least one representative feature vector corresponding to at least one of the groups.

In addition, the processor 1110 may perform at least one of the methods described above with reference to FIGS. 2 through 7 (e.g., any one or any combination of any two or more of the methods), or an algorithm corresponding to the at least one method. The processor 1110 may execute a program and control the registration apparatus 1100. A code of the program to be executed by the processor 1110 may be stored in the memory 1130. The registration apparatus 1100 may be connected to an external device, for example, a personal computer (PC) and a network, through an input and output device (not shown), and may exchange data with the external device. The registration apparatus 1100 may be provided as, or in, various computing devices and/or systems, for example, a smartphone, a tablet computer, a laptop computer, a desktop computer, a TV, a wearable device, a security system, a smart home system, and the like.

According to an example embodiment, a recognition apparatus may include a processor. The recognition apparatus may further include a memory, a communication interface, and sensors. The processor, the memory, the communication interface, and the sensors may communicate with one another through a communication bus. Thus, as non-limiting examples, the recognition apparatus may have a configuration similar to or the same as that of the registration apparatus 1100 illustrated in FIG. 11.

The processor may generate at least one input feature vector based on a speech signal, compare the input feature vector to at least one registered feature vector of a registered user stored in a registration DB, and recognize a speaker based on a result of the comparing.

The memory may include the registration DB including feature vectors. The registration DB may include at least one registered feature vector which is generated based on a synthesized signal of a speech signal and a noise signal for registering a user. The memory may be a volatile or nonvolatile memory.

The sensors may include an acoustic sensor configured to receive a speech signal of a speaker, and collect various sets of sound information.

According to an example, the processor may perform a domain transformation on a speech signal of a speaker, and extract an input feature vector from a result of the domain transformation. The processor may perform a sliding window operation on the speech signal of the speaker such that a window size of the speech signal is equal to a window size of a registered feature vector. The processor may perform an FFT on the speech signal of the speaker, and perform padding on a result of the FFT.

The recognition apparatus may be provided as, or in, various computing devices and/or systems, for example, a smartphone, a tablet computer, a laptop computer, a desktop computer, a TV, a wearable device, a security system, a smart home system, and the like.

Figure 12:
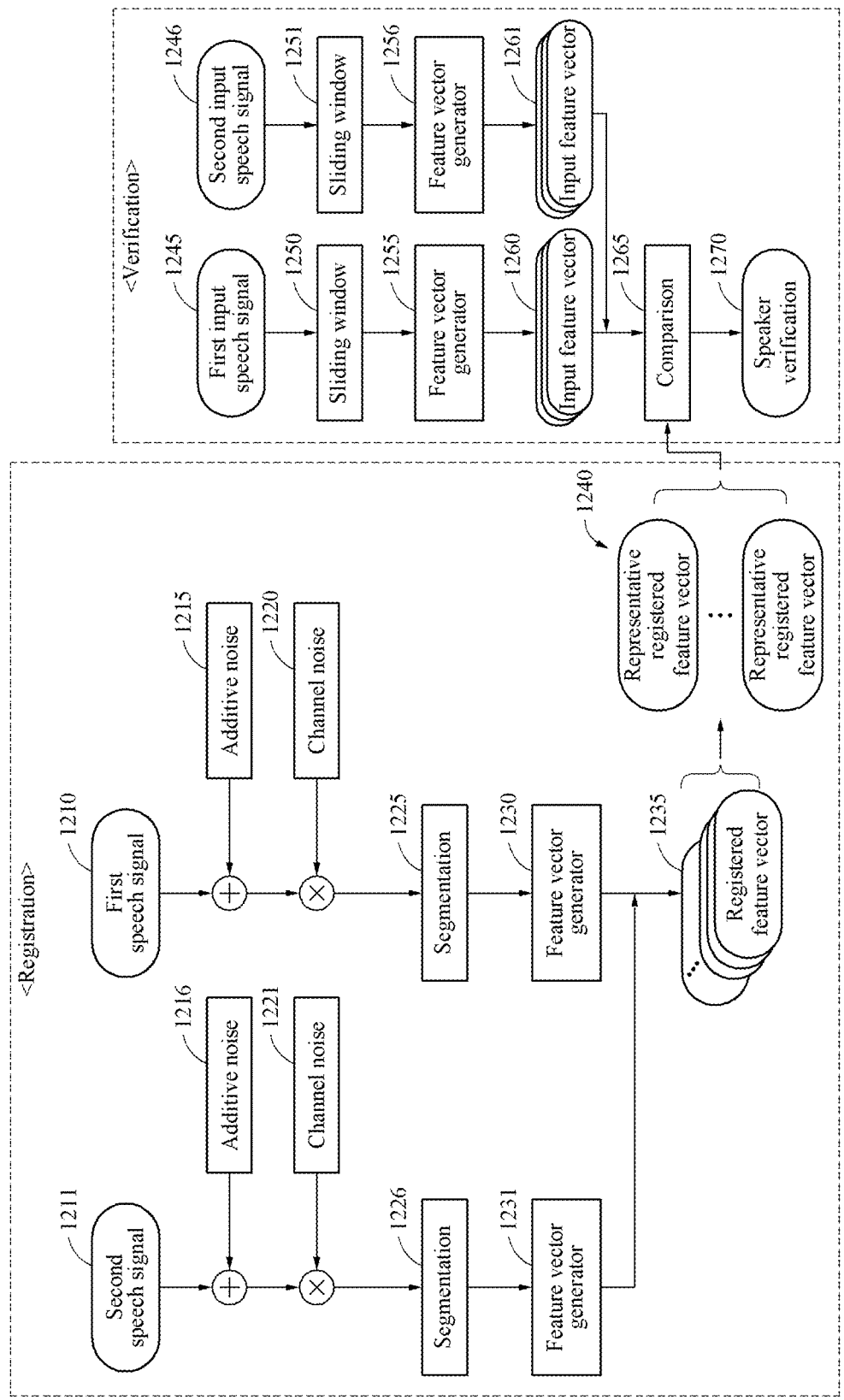
FIG. 12 illustrates an example of a speaker verification method using a plurality of channels.

FIG. 12 illustrates an example of a speaker verification method using a plurality of channels. Referring to FIG. 12, a registration process and a test process may be performed through a plurality of channels.

A registration apparatus may include a plurality of acoustic sensors each including a channel. A channel used herein indicates a passage through which information or signals are ensured to be transmitted, and each of channels may be independent from one another, and thus a signal of each of the channels may be independent without interference. Hereinafter, an example of an environment including two channels will be mainly described for convenience of description, but the example may also be applied to other environments including three or more channels.

Referring to FIG. 12, in the registration process, the acoustic sensors of the registration apparatus receive a first speech signal 1210 to be registered and a second speech signal 1211 to be registered, respectively. The first speech signal 1210 and the second speech signal 1211 may be signals simultaneously generated from a same sound source. For example, the first speech signal 1210 may be a signal input through a microphone located at a lower end of the registration apparatus, and the second speech signal 1211 may be a signal input through a microphone located at an upper end of the registration apparatus.

An operation to be performed in the registration process using a plurality of channels may be performed independently through the channels, and a detailed operation to be performed in the registration process using a single channel which is described above with reference to FIG. 8 may be applied to the registration process using the plurality of channels. For example, as illustrated in FIG. 12, the registration apparatus generates a registered feature vector for the first speech signal by synthesizing the first speech signal 1210 received through the microphone located at the lower end of the registration apparatus, and additive noise 1215 and channel noise 1220, performing segmentation on the synthesized signal in stage 1225, and then inputting a result of the segmentation performed in stage 1225 to a feature vector generator 1230. In the same way, the registration apparatus independently generates a registered feature vector for the second speech signal 1211 received through the microphone located at the upper end of the registration apparatus. That is, the registration apparatus generates a registered feature vector for the second speech signal 1211 by synthesizing the second speech signal 1211 received through the microphone located at the upper end of the registration apparatus, and second additive noise 1216 and second channel noise 1221, performing segmentation on the synthesized signal in stage 1226, and then inputting a result of the segmentation performed in stage 1226 to a second feature vector generator 1231.

The registration apparatus extracts a representative registered feature vector 1240 based on a registered feature vector generated in each channel, and constructs a registration DB based on a result of the extracting. Since a registered feature vector is generated for each channel, more various registered feature vectors may be generated. Here, a registered feature vector used herein may indicate a feature vector to be registered, and a representative registered feature vector used herein may indicate a feature vector to be registered which may represent registered feature vectors.

In the same way the registration process is performed, the test process may be performed independently for each of the channels, for example. For example, as illustrated, the registration apparatus generates an input feature vector independently for each channel by receiving a first input speech signal 1245 through the microphone located at the lower end of the registration apparatus and receiving a second input speech signal 1246 through the microphone located at the upper end of the registration apparatus. In such example, since an input feature vector is generated for each channel, more various input feature vectors may be generated.

For example, the registration apparatus receives the first input speech signal 1245 and performs a sliding window operation on the first input speech signal 1245 in stage 1250 to generate a first input feature vector 1260 using a feature vector generator 1255. Additionally, for example, the registration apparatus receives the second input speech signal 1246 and performs a sliding window operation on the second input speech signal 1246 in stage 1251 to generate a second input feature vector 1261 using a feature vector generator 1256.

In stage 1265, the registration apparatus compares either one or both of the first input feature vector 1260 and the second input feature vector 1261 to the registered feature vector 1235 or the representative registered feature vector 1240. In stage 1270, the registration apparatus verifies the speaker based on the result of the comparing performed in stage 1265.

Figure 13:
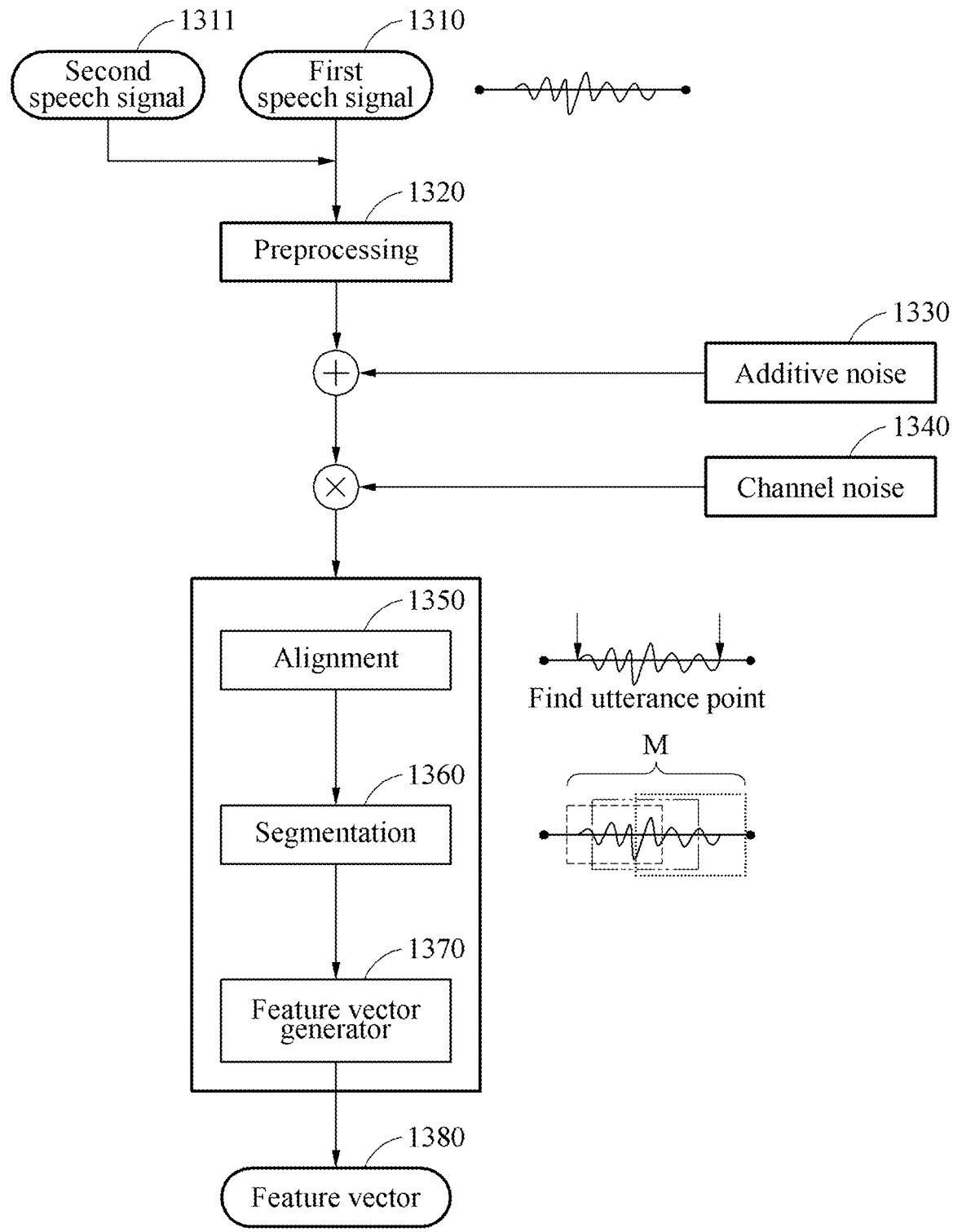
FIG. 13 illustrates an example of a speaker verification method through channel selection.

FIG. 13 illustrates an example of a speaker verification method through channel selection.

Referring to FIG. 13, a registration apparatus includes a plurality of acoustic sensors each including a channel. Hereinafter, although an example of an environment including two channels be mainly described for convenience of description, the example may also be applied to other environments including three or more channels. The descriptions provided above with reference to FIGS. 1 through 12 may be applicable to the example of FIG. 13, and a repeated and detailed description will be omitted for increased clarity and conciseness.

The acoustic sensors of the registration apparatus receive a first speech signal 1310 of a speaker and a second speech signal 1311 of the speaker, respectively. The first speech signal 1310 and the second speech signal 1311 correspond to a registered speech signal. The registration apparatus preprocesses the received speech signals 1310 and 1311 in stage 1320.

In an example, the registration apparatus estimates noise based on a difference between the speech signals 1310 and 1311, and obtains a signal from which the noise is removed by subtracting the noise from each of the speech signals 1310 and 1311. For example, a shared portion in the speech signals 1310 and 1311 may have a high probability of corresponding to a speech of the speaker, and the difference between the speech signals 1310 and 1311 may have a high probability of corresponding to noise. Thus, the noise may be estimated based on the difference between the speech signals 1310 and 1311, and the signal from which the noise is removed may be obtained by subtracting the noise from each of the speech signals 1310 and 1311 of the speaker.

In another example, the registration apparatus selects one from speech signals of the speaker received through a plurality of channels. When a speech signal of an allowable input size or greater is input to an acoustic sensor of the registration apparatus having an allowable limited input, a recognition error, for example, clipping, may occur due to a hardware specification of the registration apparatus. For example, when a speech signal is input from a location extremely close to the acoustic sensor, or a speech signal is input by an extremely loud utterance, such clipping may occur. In a speaker recognition method using a single channel, a recognition error may occur due to such clipping. However, the registration apparatus may select one speech signal from among the speech signals of the speaker received through the channels for each section, thereby reducing such error.

For example, when a speech signal is input from a location close to an acoustic sensor at a lower end of the registration apparatus, the speech signal 1310 received from the acoustic sensor at the lower end of the registration apparatus may be clipped, the speech signal 1311 received from an acoustic sensor at an upper end of the registration apparatus may be normally input. In this example, the speech signal 1311 received through the acoustic sensor at the upper end of the registration apparatus, in which clipping does not occur in stage 1320 in which the preprocessing is performed, may be selected. Thus, a clipping issue may be resolved.

In addition, the registration apparatus may select one speech signal from among the speech signals of the speaker received through the channels for each section of the signals. For example, the registration apparatus may select the speech signal 1310 in a first section, and the speech signal 1311 in a second section.

For subsequent operations indicated by reference numerals 1330 through 1380 in FIG. 13, reference may be made to the description of the operations of the registration system for speaker recognition which are indicated by reference numerals 220 through 270 in FIG. 2.

FIG. 14 illustrates an example of a method robust against an utterance change by a location and a direction of a registration apparatus 10.

When a registration apparatus receives a speech signal through a single channel, a recognition error may occur due to a change in utterance by a reverberation characteristic of the registration apparatus. For example, in a registration process 1400, an acoustic sensor 14 of the registration apparatus 10 is located at an open space, and thus there is no reverberation by a table 20. In a test process 1450, the acoustic sensor 14 is located on the table 20, and thus there is reverberation. In this example, a recognition error may occur due to a change in utterance by a reverberation characteristic of the registration apparatus 10.

However, in a case in which the registration apparatus 10 adds a registered feature vector using a plurality of channels, the registration apparatus 10 may apply a change in utterance based on a direction of the registration apparatus 10, thereby increasing a speaker recognition rate. For example, in the registration process 1400, the acoustic sensor 14, which is disposed at a lower end of the registration apparatus, is located at an open space and an acoustic sensor 16, which is disposed at an upper end of the registration apparatus, is located on the table 20, and thus the registration apparatus 10 may perform a registration in an environment the same as that in which the test process 1450 is performed. Thus, when the registration apparatus 10 uses a plurality of channels, a change in utterance based on a reverberation characteristic of the registration apparatus may be considered and applied.

In addition, a speaker recognition rate may be increased without an additional time delay in speaker recognition in an environment in which a plurality of channels is processed in parallel, for example, a multithreading environment, although the registration apparatus 10 uses the plurality of channels.

The preprocessors 430 and 530, the neural networks 440 and 540, the feature vector generators 230, 630, 830, 855, 1015, 1035, 1230, 1231, 1255, 1256, and 1370, the processor 1110, and the memory 1130 in FIGS. 2, 4-6, 8, and 10-13 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 and 12-14 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMS, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method with registration, comprising:
   receiving a speech signal of a speaker, wherein the receiving of the speech signal comprises receiving speech signals of the speaker through channels;
   estimating noise based on a difference between the received speech signals;
   subtracting the noise from each of the received speech signals received through each of the channels;
   synthesizing the received speech signal and a noise signal to generate a synthesized signal;
   generating a feature vector based on the synthesized signal,
   wherein the synthesizing and the generating are performed independently for each of the received signals from which the noise is subtracted; and
   constructing a registration database (DB) corresponding to the speaker based on the generated feature vector, wherein the constructing of the registration DB comprises constructing the registration DB based on the feature vector generated through the channels.

2. The method of claim 1, further comprising:
   generating a second feature vector based on the received speech signal,
   wherein the constructing of the registration DB comprises constructing the registration DB based on either one or both of the feature vector and the second feature vector.

3. The method of claim 2, wherein the constructing of the registration DB comprises:
   clustering, into groups, a plurality of feature vectors including either one or both of the feature vector and the second feature vector; and
   extracting at least one representative feature vector corresponding to at least one of the groups.

4. The method of claim 2, wherein the second feature vector is based on the received speech signal without the synthesizing.

5. The method of claim 1, wherein the generating of the feature vector comprises:
   performing a domain transformation on the synthesized signal; and
   extracting the feature vector from a result of the domain transformation.

6. The method of claim 5, wherein the synthesized signal includes time-domain sound information, and the result of the domain transformation includes frequency-domain image information,
   wherein the generating of the feature vector comprises extracting the feature vector from the frequency-domain image information using a convolutional neural network (CNN).

7. The method of claim 1, wherein the synthesizing comprises adding the noise signal to the received speech signal, and the noise signal comprises an additive noise signal.

8. The method of claim 7, wherein the additive noise signal is determined based on any one or any combination of any two or more of a type of noise, a timing of noise, and a signal-to-noise ratio (SNR) indicating an energy ratio of noise to the speech signal.

9. The method of claim 1, wherein the synthesizing comprises performing a convolution operation on the received speech signal and the noise signal, and the noise signal comprises a channel noise signal.

10. The method of claim 9, wherein the channel noise signal is determined based on at least one of a type of noise or an SNR indicating an energy ratio of noise to the speech signal.

11. The method of claim 1, wherein the generating of the feature vector comprises:
    segmenting the synthesized signal into sections; and
    extracting at least one sectional feature vector corresponding to at least one of the sections.

12. The method of claim 1, further comprising:
    extracting a start point and an end point of sound information included in either one or both of the speech signal and the synthesized signal,
    wherein the start point and the end point are applied to either one or both of the synthesizing and the generating.

13. The method of claim 1, wherein the constructing of the registration DB comprises constructing the registration DB based on feature vectors generated through the channels.

14. The method of claim 1, wherein the receiving of the speech signal comprises receiving speech signals of the speaker through channels, and
    wherein the registration method further comprises:
    determining the speech signal for the synthesizing by preprocessing the received speech signals.

15. The method of claim 14, wherein the determining of the speech signal comprises selecting one speech signal from the received speech signals based on whether a recognition error due to a hardware specification is included in the received speech signals.

16. The method of claim 14, wherein the determining of the speech signal comprises selecting one speech signal from the received speech signals for each section among sections of the received speech signals based on whether a recognition error due to a hardware specification is included in each section of the received speech signals.

17. The method of claim 1, further comprising recognizing the speaker by comparing an input speech signal to the generated feature vector.

18. A non-transitory computer-readable storage medium storing instructions that, when executed by a processor, cause the processor to perform the method of claim 1.

19. A speaker recognition method, comprising:
receiving speech signals of a speaker through channels;
generating at least one input feature vector based on the speech signals;
comparing the at least one input feature vector to at least one registered feature vector of a registered user stored in a registration database (DB); and
recognizing the speaker based on a result of the comparing,
wherein the at least one registered feature vector is generated based on a synthesized signal of a speech signal used for registering the registered user and a noise signal,
wherein the generating further includes estimating the noise signal based on a difference between the speech signals which are received through the channels and subtracting the noise signal from one of the speech signals, and
wherein the generating and the comparing are performed independently for each of the channels, and the registered feature vector comprises registered feature vectors generated through the channels.

20. The speaker recognition method of claim 19, wherein the registered user comprises a plurality of registered users, and the recognizing of the speaker comprises identifying the speaker from among the plurality of registered users.

21. The speaker recognition method of claim 19, wherein the generating of the at least one input feature vector comprises:
performing a domain transformation on the received speech signal; and
extracting the input feature vector from a result of the domain transformation.

22. The speaker recognition method of claim 21, wherein the performing of the domain transformation comprises:
performing a fast Fourier transform (FFT) on the received speech signal; and
performing padding on a result of the FFT based on the result of the FFT.

23. The speaker recognition method of claim 19, wherein the generating of the at least one input feature vector comprises:
performing a sliding window operation on the received speech signal such that a window size of the input feature vector is equal to a window size of the registered feature vector.

24. The speaker recognition method of claim 19, wherein a number of the at least one input feature vector is determined based on a security level or a response time that is required by an application.

25. The speaker recognition method of claim 19, wherein the noise signal comprises either one or both of an additive noise signal and a channel noise signal.

26. The speaker recognition method of claim 19, wherein the receiving of the speech signal comprises receiving speech signals of the speaker through channels, and
wherein the speaker recognition method further comprises:
determining the speech signal for the synthesizing by preprocessing the received speech signals.

27. The speaker recognition method of claim 26, wherein the determining of the speech signal comprises selecting one speech signal from the received speech signals based on whether a recognition error due to a hardware specification is included in the received speech signals.

28. The speaker recognition method of claim 26, wherein the determining of the speech signal comprises selecting one speech signal from the received speech signals for each section among sections of the received speech signals based on whether a recognition error due to a hardware specification is included in each section of the received speech signals.

29. The method of claim 19, further comprising generating the at least one registered feature vector based on the synthesized signal and storing the at least one registered feature vector in the registration DB, prior to the receiving of the speech signal.

30. A non-transitory computer-readable storage medium storing instructions that, when executed by a processor, cause the processor to perform the registration method of claim 19.

31. An apparatus with registration, comprising:
an acoustic sensor configured to receive speech signals of a speaker through channels; and
a processor configured to estimate noise based on a difference between the received speech signals, subtract the noise from each of the received speech signals received through each of the channels, synthesize at least one of the speech signals and a noise signal to generate a synthesized signal, generate a feature vector based on the synthesized signal, and construct a registration database (DB) corresponding to the speaker based on the generated feature vector,
wherein the synthesizing and the generating are performed independently for each of the received speech signals, and
wherein, for the constructing of the registration DB, the processor is configured to construct the registration DB based on the feature vector generated through the channels.

32. The apparatus of claim 31, wherein the processor is further configured to generate a second feature vector based on the received speech signals, and construct the registration DB based on either one or both of the feature vector and the second feature vector.

33. The apparatus of claim 32, wherein the processor is further configured to cluster, into groups, a plurality of feature vectors including either one or both of the feature vector and the second feature vector, and extract at least one representative feature vector corresponding to at least one of the groups.

34. The apparatus of claim 32, wherein the second feature vector is based on the received speech signals without the synthesizing.

35. The apparatus of claim 31, wherein the processor is further configured to perform a domain transformation on the synthesized signal, and extract the feature vector from a result of the domain transformation.

36. The apparatus of claim 31, wherein the processor is further configured to add the noise signal to the received speech signals, wherein the noise signal comprises an additive noise signal.

37. The apparatus of claim 31, wherein the processor is further configured to perform a convolution operation on the received speech signals and the noise signal, wherein the noise signal comprises a channel noise signal.

38. The apparatus of claim 31, wherein the processor is further configured to segment the synthesized signal into sections, and extract at least one sectional feature vector corresponding to at least one of the sections.

39. The apparatus of claim 31, wherein the processor is further configured to recognize the speaker by comparing an input speech signal to the generated feature vector.

40. An apparatus with speaker recognition, comprising:
an acoustic sensor configured to receive a speech signal of a speaker through channels; and
a processor configured to:
   generate at least one input feature vector based on the received speech signal;
   compare the at least one input feature vector to at least one registered feature vector of a registered user stored in a registration database; and
   recognize the speaker based on a result of the comparing,
wherein the at least one registered feature vector is generated based on a synthesized signal of a speech signal used for registering the registered user and a noise signal,
wherein the generating further includes estimating the noise signal based on a difference between the speech signals which are received through the channels and subtracting the noise signal from one of the speech signals, and
wherein the generating and the comparing are performed independently for each of the channels, and the registered feature vector comprises registered feature vectors generated through the channels.

41. The apparatus of claim 40, wherein the processor is further configured to perform a domain transformation on the received speech signal, and extract the input feature vector from a result of the domain transformation.

42. The apparatus of claim 40, wherein the processor is further configured to perform a sliding window operation on the received speech signal such that a window size of the input feature vector is equal to a window size of the registered feature vector.

43. The apparatus of claim 40, wherein the processor is further configured to:
   perform a fast Fourier transform (FFT) on the received speech signal; and
   perform padding on a result of the FFT based on the result of the FFT.

44. The apparatus of claim 40, wherein the processor is further configured to generate the at least one registered feature vector based on the synthesized signal and store the at least one registered feature vector in the registration DB, prior to the receiving of the speech signal.

\* \* \* \* \*